United States Patent [19]

Tsao

[11] Patent Number: 4,882,307

[45] Date of Patent: Nov. 21, 1989

[54] PROCESS FOR PREPARING NOBLE METAL-CONTAINING ZEOLITES

[75] Inventor: Ying-Yen P. Tsao, Lahaska, Pa.

[73] Assignee: Mobil Oil Corporation, New York, N.Y.

[21] Appl. No.: 92,248

[22] Filed: Sep. 2, 1987

[51] Int. Cl.$^4$ .......................... B01J 29/12; B01J 29/32
[52] U.S. Cl. .......................................... 502/66; 502/74
[58] Field of Search ............................. 502/66, 74, 85

[56] References Cited

U.S. PATENT DOCUMENTS

| | | | |
|---|---|---|---|
| 3,226,339 | 12/1965 | Frilette et al. | 252/455 |
| 3,783,123 | 1/1974 | Young | 502/85 |
| 4,539,305 | 9/1985 | Wilson et al. | 502/85 |
| 4,683,052 | 7/1987 | Degnan, Jr. et al. | 208/111 |
| 4,683,274 | 7/1987 | Nakamura et al. | 526/216 |
| 4,717,700 | 1/1988 | Venkatram et al. | 502/85 |

Primary Examiner—Carl F. Dees
Attorney, Agent, or Firm—Alexander J. McKillop; Charles J. Speciale; Dennis P. Santini

[57] ABSTRACT

A process for preparing noble metal-containing zeolites having high noble metal dispersion comprises (a) contacting a zeolite material with a cationic noble metal complex; (b) calcining the resulting meterial in the presence of molecular oxygen at about 300° to 375° C. for a time sufficient to cause decomposition of said complex; (c) purging oxygen and water from the calcined material in an inert atmosphere at 200° to 350° C.; and (d) reducing the purged material with hydrogen at 200° to 350° C. for a time sufficient to reduce the cationic noble metal to highly dispersed free metal.

19 Claims, No Drawings

PROCESS FOR PREPARING NOBLE METAL-CONTAINING ZEOLITES

This invention relates to a process for preparing porous crystalline molecular sieve materials containing highly dispersed noble metal.

Noble metal-containing zeolite catalysts and their methods of preparation are well-known in the prior art. For example, U.S. Pat. No. 3,226,339 incorporated herein by reference, teaches a process for preparing platinum metal-crystalline zeolite catalysts having a pore size of 10 to 13 angstroms. The method comprises contacting a zeolite by ion-exchange with platinum metal containing ion from a solution of ionizable platinum metal compound followed by activating the resulting zeolite by thermal treatment in air at 250° to 1100° F., followed by reduction in hydrogen at 250° to 1100° F. in order to effect at least partial reduction of the platinum metal ion to the platinum metal. In Example 1, the reference teaches an embodiment wherein the thermally treated product is flushed in nitrogen before reduction in hydrogen at a temperature of 800° F. It is also known in the art that the gaseous environment in which some zeolites are thermally treated before reduction can affect the size of resulting platinum crystals in impregnated Pt-zeolite catalysts, probably owing to formation of Pt products such as $PtO_2$ and PtH which have different mobility and sensitivity to reduction. It is also known that pretreatment and reduction conditions such as temperature can affect the extent of metal agglomeration. See Zeolite Chemistry and Catalysis, Ed. J. A. Rabo, Chapter 10—Catalytic Properties of Metal-Containing Zeolites, pp. 552 to 611, (pages 558 to 565) American Chemical Society, 1976.

Despite these teachings, it has been difficult to prepare noble metal-containing zeolites which exhibit enhanced dispersion over their starting material zeolite after the reduction step because of the tendency of noble metal to agglomerate during treatment with hydrogen, even at temperatures as low as 150° to 200° C.

Other methods of preparing noble metal zeolites are set out in U.S. Pat. Nos. 4,683,052 and 4,683,274. U.S. application Ser. No. 938,088 filed Dec. 4, 1986 teaches a method for activating oxidized noble metal zeolite catalysts by reduction with hydrogen at relatively low temperatures (100° to 200° C.).

It has now been found that noble metal-containing zeolite material of enhanced noble metal dispersion can be prepared by a process which comprises:

(a) contacting a zeolite material with a cationic noble metal complex;

(b) calcining the resulting material in the presence of oxygen at about 300° to 375° C. for a period of time sufficient to cause decomposition of the noble metal complex into a product containing cationic noble metal species;

(c) purging oxygen and water from the resulting material with an inert gas at 200° to 350° C.; and (d) reducing the resulting material with hydrogen at 200° to 350° C. for a period of time sufficient to reduce said cationic noble metal species to highly dispersed free metal.

Catalysts produced by the method of the present invention are particularly useful in any process or combination of processes which employ metal catalyst components such as platinum or palladium, as well as other noble metals. Examples of such processes include hydrogenation, dehydrogenation, dehydrocyclization, isomerization, hydrocracking, dewaxing, reforming, conversion of alkyl aromatics, oxidation, etc. The catalysts of the present invention have been found to be particularly useful in catalytic dewaxing of distillate fuel oils and gas oils wherein waxy components are isomerized by contact with a zeolite beta catalyst, according to the process disclosed in U.S. Pat. No. 4,419,220 to LaPierre et al., incorporated herein by reference.

The noble metal-containing catalysts of the present invention comprise a zeolite, such as those of the novel class of zeolites as defined herein, a noble metal and, optionally, a binder.

For the purpose of this invention, the term "zeolite" is meant to represent the class of porotectosilicates, i.e., porous crystalline silicates that usually contain silicon and oxygen atoms as the major components. Other components may be present in minor amounts, usually less than 14 mole % and preferably less than 4 mole %. These components include aluminum, gallium, iron, boron, phosphorus and the like with aluminum being preferred and used herein for illustration purposes. The minor components may be present separately or in mixtures.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other forms within the channels. Although zeolites with a silica to alumina mole ratio of at least 12 are useful, it is preferred in some instances to use zeolites having much higher silica to alumina mole ratios. Thus zeolites useful in the present invention can have silica to alumina molar ratios of at least about 20, 25, 70, or in some instances at least 100 or even at least 200.

A particular class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross section than normal hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

Rather than attempt to judge from crystal structure whether or not a zeolite possesses the necessary constrained access to molecules of larger cross section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. (1005° F.) for at least 15 minutes. The zeolite is then flushed with helium and the temperature is adjusted between 290° C. (555° F.) and 510° C. (950° F.) to give an overall conversion of between 10% and 60%. The mixture of hydrocarbons is passed at 1 liquid hourly space velocity (i.e. 1 volume of liquid hydrocarbon per volume of zeolite per hour) over the the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10% to 60% for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. (1005° F.) and a liquid hourly space velocity (LHSV) of less than one, such as 0.1 or less, can be employed in order to achieve a minimum total conversion of about 10%.

There also may be instances where the activity is so low (i.e., silica to alumina mole ratio approaching infinity) that the Constraint Index cannot be adequately measured, if at all. In such situations, Constraint Index is meant to mean the Constraint Index of the exact same substance (i.e. same crystal structure as determined by such means as X-ray diffraction pattern) but in a measureable form (i.e. aluminum containing form).

The "Constraint Index" is calculated as follows:

$$\text{Constraint Index} = \frac{\log 10(\text{fraction of hexane remaining})}{\log 10(\text{fraction of 3-methylpentane remaining})}$$

The Constraint Index approximates the ratio of the cracking rate constants for the two hydrocarbons. Zeolites suitable for the present invention are those having a Constraint Index in the appropriate range in 0.1 to 12.

Constraint Index (CI) values for some typical materials are:

|  | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6.–2.0 (316° C.–399° C.) |

The above-described Constraint Index is an important and even critical definition of certain porous crystalline silicates which are useful in the instant invention. The very nature of this parameter and the recited technique by which it is determined, however, admit of the possibility that a given porous crystalline silicate can be tested under somewhat different conditions and thereby exhibit different Constraint Indices. Constraint Index seems to vary somewhat with severity of operations (conversion) and the presence or absence of binders. Likewise, other variables, such as crystal size of the porous crystalline silicate, the presence of occluded contaminants, etc., may affect the Constraint Index. Therefore, it will be appreciated that it may be possible to so select test conditions, e.g. temperature, as to establish more than one value for the Constraint Index of a particular porous crystalline silicate. This explains the range of Constraint Indices for some zeolites, such as ZSM-5, ZSM-11 and Beta.

It is to be realized that the above CI values typically characterize the specified porous crystalline silicates, but that such are the cumulative result of several variables useful in the determination and calculation thereof. Thus, for a given material exhibiting a CI value within the range of 1 to 12, depending on the temperature employed during the test method within the aforenoted range of 550° F. (290° C.) to 950° F. (570° C.), with accompanying conversion between 10% and 60%, the CI may vary within the indicated range of 1 to 12. Likewise, other variables such as the crystal size of the material, the presence of possibly occluded contaminants and binders intimately combined with the zeolite may affect the CI. It will accordingly be understood to those skilled in the art that the CI, as utilized herein, while affording a highly useful means for characterizing the materials of interest is approximate, taking into consideration the manner of its determination, with the possibility, in some instances, of compounding variable extremes. However, in all instances, at a temperature within the above-specified range of 550° F. to 950° C., the CI will have a value for any given material of interest herein within the approximate range of 1 to 12.

The particular class of zeolites defined herein is exemplified by zeolite beta, ZSM-5, ZSM-11, ZSM-5/ZSM-11 intermediate, ZSM-12, ZSM-23, ZSM-35, ZSM-38, ZSM-48, and other similar materials.

Zeolite beta is described in U.S. Pat. No. 3,308,069.

ZSM-5 is described in U.S. Pats. No. 3,702,886 and Re. No. 29,949. Such descriptions include the X-ray diffraction pattern of the therein disclosed ZSM-5.

ZSM-11 is described in U.S. Pat. No. 3,709,979. That description also includes the particular X-ray diffraction pattern of said ZSM-11.

ZSM-5/ZSM-11 intermediate is described in U.S. Pat. No. 4,229,424.

ZSM-12 is described in U.S. Pat. No. 3,832,449. That description also includes the particular X-ray diffraction pattern of said ZSM-12.

ZSM-23 is described in U.S. Pat. No. 4,076,842 which includes the specification of the X-ray diffraction pattern of the disclosed zeolite.

ZSM-35 is described in U.S. Pat. No. 4,016,245 which includes the X-ray diffraction pattern thereof.

ZSM-38 is described in U.S. Pat. No. 4,046,859 which includes the X-ray diffraction pattern of said ZSM-38.

ZSM-48 is described in U.S. Pat. No. 4,234,231 which includes the X-ray diffraction pattern of said ZSM-48. All of the above patents are incorporated herein by reference.

It is to be understood that by citing the foregoing patents as describing examples of specific members of the zeolite class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The citation of the identified patents should therefore not be construed as limiting the disclosed crystalline zeolites to those having the specific silica-alumina mole ratios discussed therein, it now being known that such zeolites may contain very low amounts of aluminum and yet, having the same crystal structure as the disclosed materials, may be useful or even preferred in some applications. It is the crystal structure, as identified by the X-ray diffraction "fingerprint", which establishes the identity of the specific crystalline zeolite material.

The preferred crystalline zeolites for utilization herein include ZSM-5, ZSM-11, ZSM-12, ZSM-23, ZSM-35, ZSM-38, ZSM-48, and zeolite beta with ZSM-5, ZSM-11, and zeolite beta being particularly preferred.

Other zeolites suitable for use in the present invention include larger pore size zeolites such as ZSM-18, ZSM-20, faujasite Y, mordenite and zeolite L.

ZSM-18 described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

As is the case of many catalysts, it is desired to incorporate the zeolite with another material resistant to the temperatures and other conditions employed in organic conversion processes. Such materials include active and inactive materials as well as inorganic materials such as clays, silica and/or metal oxides. Inactive materials suitably serve as diluents to control the amount of conversion in a given process so that products can be obtained economically without employing other means for controlling rate of reaction. Binders useful for compositing with the useful zeolite herein also include inorganic oxides, notably alumina, which is particularly preferred.

In addition to the foregoing material, the zeolite catalyst can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The relative proportions of finely divided crystalline zeolite and inorganic oxide matrix may vary widely with the zeolite content ranging from about 1 to about 90 percent by weight, and more usually in the range of about 10 to about 50 percent by weight of the composite.

In one preferred embodiment of the invention, the calcining step is carried out at about 300° to 375° C. The purging step can be carried out at 200° to 350° C. and the reducing step can also be carried out at 200° to 300° C.

The catalysts of the present invention can be prepared by bringing a suitable crystalline zeolite, of the nature described above and having uniform interstitial dimensions sufficiently large to permit introduction by ion exchange of a noble metal-containing cation, into contact with a solution comprising ionizable compound of a platinum metal for a sufficient period of time to effect deposition on the crystalline structure of the zeolite of a noble metal-containing ion derived from such a solution, drying the resulting composite and subjecting the same to an activating treatment.

The noble metals contained in the present catalyst composition include those having atomic numbers 44 to 47 and 76 to 79 inclusive, namely platinum, palladium, ruthenium, osmium, iridium, rhodium, silver and gold. Of this group, platinum and palladium are accorded preference. Each of the noble metals may occur in a variety of compounds. Thus, suitable compounds include, e.g., chloroplatinic acid, platinous chloride and various compounds containing the platinum ammine complex. The compounds of the useful noble metals are ionizable noble metal compounds in which the metal is in the cationic state, i.e. in the form of a cation or cation complex, since with such compounds exchange of the original metal ion contained in the metal aluminosilicate crystalline zeolite with the platinum metal-containing cation is readily achieved. A solution in which the noble metals are in the form of a cation or cationic complex, e.g. $Pt(NH_3)_6Cl_4$ is readily distinguishable from one in which they are in the anionic portion, e.g. $Na_2[PtCl_6]$, by contacting such solutions with the sodium salt of an organic cation exchanger. Under such conditions, the cation which contains noble metal will be removed from solution by the exchanger, while the noble metal-containing anion will be substantially unaffected.

A wide variety of metallic compounds can be employed with facility as a source of noble metal cations and include both inorganic and organic salts of the noble metals. Representative of the salts which can be employed are chlorides, bromides, iodides, carbonates, bicarbonates, sulfates, sufites, sulfides, chlorates, perchlorates, thionates, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartarates and the like. The only limitation is that the salt be sufficiently soluble in the fluid medium to give the necessary ion transfer.

It is contemplated that water will ordinarily be the solvent in the noble metal-containing solutions used. However, it will be understood that other solvents, although generally less preferred, may also be used. Thus, in addition to aqueous solutions, alcoholic solutions, etc., of the noble metal-containing compounds may be employed in the present process. The compounds of the noble metals undergo ionization in the particular solvent used. The concentration of the noble metal compound in the solution employed may vary widely depending on the amount of noble metal desired in the final catalyst composition and on the conditions under which contact between the crystalline zeolite and such solution is effected. Other conditions being equal, a shorter time of contact between the crystalline zeolite and noble metal-containing solution may be used with the more concentrated solutions, while a longer period of contact is required with the more dilute solutions.

The solutions of noble metal compound may be contacted with the crystalline zeolite of uniform pore structure in the form of either a fine powder, a compressed pellet or an extruded pellet. When in the form of a pellet, the crystalline zeolite may be combined with a suitable binder such as clay. The crystalline zeolite is initially free of noble metal having rigid three dimensional networks characterized by uniform interstitial dimensions sufficiently large to permit introduction by ion exchange of a noble metal-containing ion. The metal originally contained in the zeolite will generally be an alkali or alkaline earth metal, e.g., sodium or calcium, although these may be replaced at least in part by other ions which do not ordinarily affect the crystalline structure such as for example silver, lithium, potassium, magnesium, cobalt and also ammonium ions.

Good noble metal dispersion (i.e, small crystallite size, less than about 20 or even 10 Angstroms) is an important property for satisfactory performance of noble metal-containing zeolite catalyst material. The present invention is suitable for preparing noble metal-containing catalysts having noble metal dispersion, as measured by hydrogen chemisorption, hydrogen to noble metal ratio, e.g., H/Pt, of at least about 0.8, preferably at least about 1.0. Conventional volumetric chemisorption techniques which are employed to measure hydrogen chemisorption are discussed in *Structure of Metallic Catalysts*, J. R. Anderson, Academic Press, 1975, Chapter 6, incorporated herein by reference.

The volume of solution containing noble metal compound may be just sufficient to be adsorbed by the crystalline zeolite. Generally, however, an excess of solution is employed and such excess is removed from contact with the crystalline zeolite after a suitable period of contact and prior to drying of the zeolite. The time of contact between the solution of noble metal compound and crystalline zeolite is such as to effect deposition on the crystalline structure of the noble metal-containing ion derived from such solution. It will be appreciated that such period of contact may vary widely depending on the temperature of the solution, the nature of crystalline zeolite used, the particular noble metal compound employed, and the concentration of noble metal desired in the final catalyst. Thus, the time of contact may extend from a very brief period of the order of minutes for small particles to long periods of the order of days for large pellets. Generally, the time of contact will, depending on the various aforementioned factors, be within the range of 5 minutes to 10 days. The temperature of the solution will ordinarily be room temperature, but may be an elevated temperature below the boiling point of the solution.

After the contact period, the crystalline zeolite is removed from the noble metal compound solution. Excess noble metal compound and foreign salt, if employed, are removed, suitable by washing with water. The resulting material is then dried, generally in air, to remove substantially all of the water therefrom.

The dried material is then subjected to the activating treatment of the present invention.

The catalyst of this invention contains noble metal deposited on the porous crystalline silicate zeolite. The concentration of noble metal in the finished catalyst may vary depending on the use for which such catalyst is intended. The content of noble metal in the finished catalyst is generally within the approximate range of 0.001 to 5 percent by weight, preferably between about 0.05 and 2 weight percent.

The catalysts of the present invention are particularly suited to catalytic dewaxing such as the isomerization dewaxing process disclosed in U.S. Pat. No. 4,419,220. In this process a hydrocarbon feedstock such as distillate fuel oil is dewaxed by contact with a catalyst comprising zeolite beta having a silica to alumina ratio of at least 20 and a hydrogenation component such as platinum, under isomerization conditions. Isomerization conditions may include temperatures of 200° to 540° C. (392° to 1005° F.), preferably 400° to 450° C. (752° to 842° F.), pressures from atmospheric to 25,000 kPa, preferably 4,000 to 10,000 kPa, and a space velocity (LHSV) from 0.1 to 20, preferably from 0.2 to 5. Catalytic conversion conditions for conversion of alkylaromatics such as dealkylation or hydroisomerization, particularly xylene isomerization and hydroisomerization of ethylbenzene to xylene, include a temperature of between about 260° C. (500° F.) and about 600° C. (1112° F.), preferably between about 320° C. (608° F.) and 500° C.) (932° F.), a pressure of between about 240 kPa (35 psia) and about 7000 kPa (1015 psia), preferably between about 275 kPa (40 psia) and about 2860 kPa (415 psia), a hydrogen/feed mole ratio of between about 1 and 20, preferably between about 2 and about 8 and a WHSV of between about 1 and 50, preferably between about 5 and about 15.

The invention can be further described by reference to the following examples.

EXAMPLE

Preparation And Activation Of Platinum-Containing, Zeolite Beta Catalyst

A. A 65 weight percent zeolite beta/35 weight percent $Al_2O_3$ catalyst containing 0.6 weight percent platinum, streamed to an alpha value of 47 was prepared by wetting a mixture of 65 weight percent sodium tetraethylammonium zeolite beta having a $SiO_2/Al_2O_3$ molar ratio of 37 and 35 weight percent Kaiser SA alumina in order to form 1/16" diameter extrudate. The extrudate was dried at 300° F., and then calcined at 1000° F. in 30 volume/volume/minute $N_2$. The calcined product was cooled to room temperature and exchanged twice at room temperature in 1N $NH_4NO_3$, washed with deionized water and then dried at 280° F.

The resulting ammonium exchanged extrudate was steamed for 10.5 h at 1000° F. in 1 atm steam (27.8 volume/volume/minute flow). The catalyst was heated at 2.5° F./min in air to the steaming temperature of 1000° F. Alpha value was measured as 47.

The steamed extrudate was exchanged for 12 h at room temperature with $Pt(NH_3)_4Cl_2$ in 7 cc/g of circulating water and then washed three times with deionized water, drained and then dried at 280° F. The dried material was calcined for 3 hours at 660° F. in a mixture of 40% air/60% $N_2$ (6 volume/volume/minute) having a dewpoint of 29° F. The material was heated to 660° F. at a rate of 2° F./minute. The resulting catalyst showed a C content of 0.1% by weight and less than 10 ppm of N.

It was $H_2$ reduced with various procedures (see Table), and then characterized using XRD and chemisorption techniques. XRD represents, upon a careful 200° C. $H_2$ reduction of the resulting catalyst, the fraction of Pt whose particle sizes are >50 Å and detected by X-ray diffraction technique. H/Pt and O/Pt ratios represent the exposed Pt surface area upon which H and O atoms, respectively, chemisorb at 25° C.

The sample preparation steps for chemisorption measurements were as follows: Catalysts were first evacuated (0.01 Torr) at ambient temperature for 5 minutes, heated at 10° C./min to 150° C. under 0.01 Torr vacuum, then held at 150° C. for 5 minutes, and finally evacuated for 20 minutes at $10^{-6}$ Torr. About ⅓ atm of $H_2$ was introduced at 150° C., and then heated to 200° C. where it was kept for 0.5 hours. These treatments were sufficiently mild such that the platinum state was essentially unchanged. Afterwards hydrogen chemisorption isotherms were obtained with the maximum equilibrium hydrogen pressure of 400 Torr. The linear region of the isotherm normally between 40 to 400 torr was extrapolated to 0 Torr. The resulting intercept is the H/Pt ratio. After H chemisorption, catalysts were evacuated ($10^{-6}$ Torr) at 200° C. to remove chemisorbed $H_2$. Then the same technique was used to measure oxygen chemisorption. The same extrapolation scheme was subsequently applied to yield O/Pt ratio.

The treatments of catalyst were started by heating up from ambient temperature and staying at the specified temperature for a certain period, and then cooling down in the same gas stream.

The Table exhibits the hydrogen reduction conditions for the catalyst. During the heat-up, the gas used was either $H_2$ or $N_2$, and the gas flows varied from 5 to 15 cc/min/g catalyst. In the holding period, gas flow was set the same as in the heating period, unless otherwise specified.

At ambient temperature $H_2$ reduction did not alter the state of small Pt particles. A sample treated by procedure A (25° C., 40 h) gave the same chemisorption results as the fresh sample. However, at temperatures above 200° C., $H_2$ reduction started to agglomerate small Pt particles. Procedures B (200° C., 2 h) and C (450° C., 2 h) yielded lower chemisorption values, (H/Pt 0.64, O/Pt 0.44) and (H/Pt 0.62, O/Pt 0.46), than the fresh one, (H/Pt 1.04, O/Pt 0.51). It was also noticed that the H/Pt ratio was more strongly affected by these treatments than the O/Pt ratio. Chemisorption data from procedures B and C were essentially identical, indicating that the changes in Pt size distribution had occurred at 200° C. and no further deterioration was observable after that. Even when the hydrogen partial pressure was reduced from 1 atm to 0.1 atm (procedure D) at 200° C., no improvement was observed.

However, procedure E with higher hydrogen partial pressure (0.3 atm), and higher flow rate gave higher chemisorptions (H/Pt 0.88, O/Pt 0.49). There was no reason that 0.3 atm $H_2$ partial pressure was capable of retaining higher chemisorptions than those from 0.1 and 1 atm $H_2$ treatments, if Pt agglomeration was hydrogen partial pressure dependent. Thus the only explanation that procedure E gave higher values was its threefold gas flow rate. It also implied that some active species was purged out of catalyst more quickly during the heating period by the high flow rate of procedure E.

Since water is a common entrapped species in Zeolite containing catalysts, it was decided to investigate whether the presence of water during heat-up of the sample had a strong effect on the platinum size distribution. Procedure F was the same as E except that 2% of water was added to the gas mixture. Indeed, it brought down the chemisorptions to (H/Pt 0.66, O/Pt 0./42), and was similar to those from B through D. Since water seems to promote Pt agglomeration, the next thing to prove was that its absence would stop Pt agglomeration. Procedure G was designed for this purpose. The catalyst was heated to 200° C. in $N_2$ using a high gas flow rate, 12.5 cc/min/g catalyst, and then switched over at temperature to $H_2$. It gave very high values (H/Pt 1.33, O/Pt 0.63). In fact, these values were even higher than those from fresh catalyst, (H/Pt 1.04, O/Pt 0.51). Procedure H was a repeat of G, and gave the same results. Thus it appears that platinum agglomeration was not dependent on the hydrogen partial pressure in the range of 0.1 to 1 atm but may be dependent on the water partial pressure.

Procedure I was the same as G except that the $H_2$ reduction temperature was 450° C. At this temperature $H_2$ caused some Pt agglomeration even after the removal of physisorbed water in the heat-up. The chemisorption values were H/Pt 0.81 and O/Pt 0.52; but the degree of agglomeration was still lower than that caused by the presence of water. The agglomeration of Pt by procedure I appeared irreversible. A redox treatment (350° C. $O_2$, 200° C. $H_2$), as commonly applied did not recover H/Pt and O/Pt ratios back to 1.33 and 0.63, respectively. After redox treatment, the sample from procedure I gave H/Pt 0.90, and O/Pt 0.46. Thus high temperature $H_2$ reduction of noble metal zeolite catalysts was detrimental whereas the process of the invention yielded a reduced catalyst of greater dispersion.

Procedure J was the same as I except that the $H_2$ reduction temperature was 350° C. It gave slightly higher values (H/Pt 1.18, O/Pt 0.57) than the catalyst of I, but still lower than the catalyst of G which was reduced at 200° C.

It was found that the noble metal states, particle size, and locations of fresh noble metal-containing zeolite catalysts were heavily influenced by their pretreatments. In the presence of trace amounts of water, hydrogen reduction agglomerated Pt particles even at temperature as low as 200° C. Cationic Pt located inside the zeolite were highly sensitive to hydrogen reduction. Without careful removal of entrapped water from such catalysts, they can easily lose 50% of initial Pt dispersion.

TABLE

Hydrogen Reduction of Noble Metal-Containing Zeolite Beta

| Procedure | **Heating Period | | | Holding Period | | | Characterization | | |
| --- | --- | --- | --- | --- | --- | --- | --- | --- | --- |
| | Gas Composition | Flow Rate cc/min/g cat | Temp (°C.) | Duration (h) | Gas Composition | | Chemisorption | | XRD |
| | | | | | | | H/Pt | O/Pt | |
| Fresh | None | | | | None | | 1.04 | 0.51 | 0.00 |
| A | $H_2$ | 5.0 | 25 | 40 | $H_2$ | | 1.05 | 0.51 | 0.00 |
| B | $H_2$ | 5.0 | 200 | 2 | $H_2$ | | 0.64 | 0.44 | 0.01 |
| C | $H_2$ | 5.0 | 450 | 2 | $H_2$ | | 0.62 | 0.46 | 0.03 |
| D | 10% $H_2/N_2$ | 5.0 | 200 | 2 | 10% $H_2/N_2$ | | 0.68 | 0.39 | 0.01 |
| E | 33% $H_2/N_2$ | 15.0 | 200 | 2 | 33% $H_2/N_2$ | | 0.88 | 0.49 | 0.01 |
| F | 33% $H_2$/2% $H_2O/N_2$ | 15.0 | 200 | 2 | 33% $H_2$/2% $H_2O/N_2$ | | 0.66 | 0.42 | 0.01 |
| G | $N_2$ | 12.5 | 200 | 2 | $H_2$ | | 1.33 | 0.63 | 0.00 |
| H | $N_2$ | 12.5 | 200 | 2 | $H_2$ | | 1.30 | 0.62 | 0.00 |
| I | $N_2$ | 12.5 | 450 | 2 | $H_2$ | | 0.81 | 0.52 | 0.01 |

TABLE-continued

| | Hydrogen Reduction of Noble Metal-Containing Zeolite Beta | | | | | | | |
|---|---|---|---|---|---|---|---|---|
| | **Heating Period | | Holding Period | | | Characterization | | |
| | Gas | Flow Rate | Temp | Duration | Gas | Chemisorption | | |
| Procedure | Composition | cc/min/g cat | (°C.) | (h) | Composition | H/Pt | O/Pt | XRD |
| J | $N_2$ | 12.5 | 350 | 2 | $H_2$ | 1.18 | 0.57 | 0.00 |

**In the holding period, gas flow rates were the same as in the heating period, except for procedures G, H, and I where $H_2$ flows were set at 5 cc/min/g cat.

What is claimed is:

1. A process for preparing noble metal-containing zeolite material of enhanced noble metal dispersion which comprises:
   (a) contacting a zeolite material with a cationic noble metal complex;
   (b) calcining the resulting material in the presence of molecular oxygen at about 300° to 375° C. for a period of time sufficient to cause decomposition of the noble metal complex into a product containing cationic noble metal species;
   (c) purging oxygen and water from the resulting material by exposing said material to an atmosphere of inert gas at 200° to 350° C. and
   (d) reducing the resulting material with hydrogen at 200° to 350° C. for a period of time sufficient to reduce said cationic noble metal species to highly dispersed free metal.

2. The process of claim 1 wherein said calcining step is carried out at about 320° to 360° C., said purging step is carried out at 200° to 350° C. and said reducing step is carried out at 200° to 300° C.

3. The process of claim 1 wherein said zeolite is selected from the group consisting of zeolite beta, ZSM-5, ZSM-11, ZSM-12, ZSM-18, ZSM-20, ZSM-22, ZSM-23, ZSM-35 and ZSM-48.

4. The process of claim 1 wherein the zeolite is zeolite beta.

5. The process of claim 1 wherein said zeolite is selected from the group consisting of ZSM-18 and ZSM-20.

6. The process of claim 1 wherein the noble metal is selected from the group consisting of platinum, palladium, rhodium, ruthenium, silver, rhenium, and iridium.

7. The process of claim 1 wherein said noble metal is platinum.

8. The process of claim 1 wherein said zeolite material comprises a binder selected from the group consisting of silica-alumina, silica, and alumina.

9. The process of claim 8 wherein said binder is alumina.

10. The process of claim 8 wherein said zeolite material comprises about 5 to 90 weight percent binder.

11. The process of claim 1 wherein the silica to alumina mole ratio of the zeolite is at least 20 to 1.

12. The process of claim 1 wherein said noble metal-containing zeolite material contains from about 0.001 to 5 weight percent noble metal.

13. The process of claim 12 wherein said noble metal-containing zeolite material contains from about 0.05 to 2 weight percent noble metal.

14. The process of claim 1 wherein said cationic noble metal complex is selected from the compound group consisting of tetrammine platinum (II) nitrate, tetrammine platinum (II) chloride, platinum tetrafluoride, palladium chloride, palladium selenate, dichlorodiammine palladium (II) chloride, tetrammine palladium (II) chloride, and diammine palladium (II) hydroxide.

15. The process of claim 1 wherein said resulting product has a H/NM ratio greater than about 0.8.

16. The process of claim 1 wherein the resulting product has a H/NM ratio greater than about 1.0.

17. The process of claim 1 wherein said resulting product has a H/NM ratio greater than about 1.3.

18. The process of claim 1 wherein said inert gas is nitrogen.

19. The process of claim 1 wherein said inert gas is helium.

* * * * *